Figure 1:
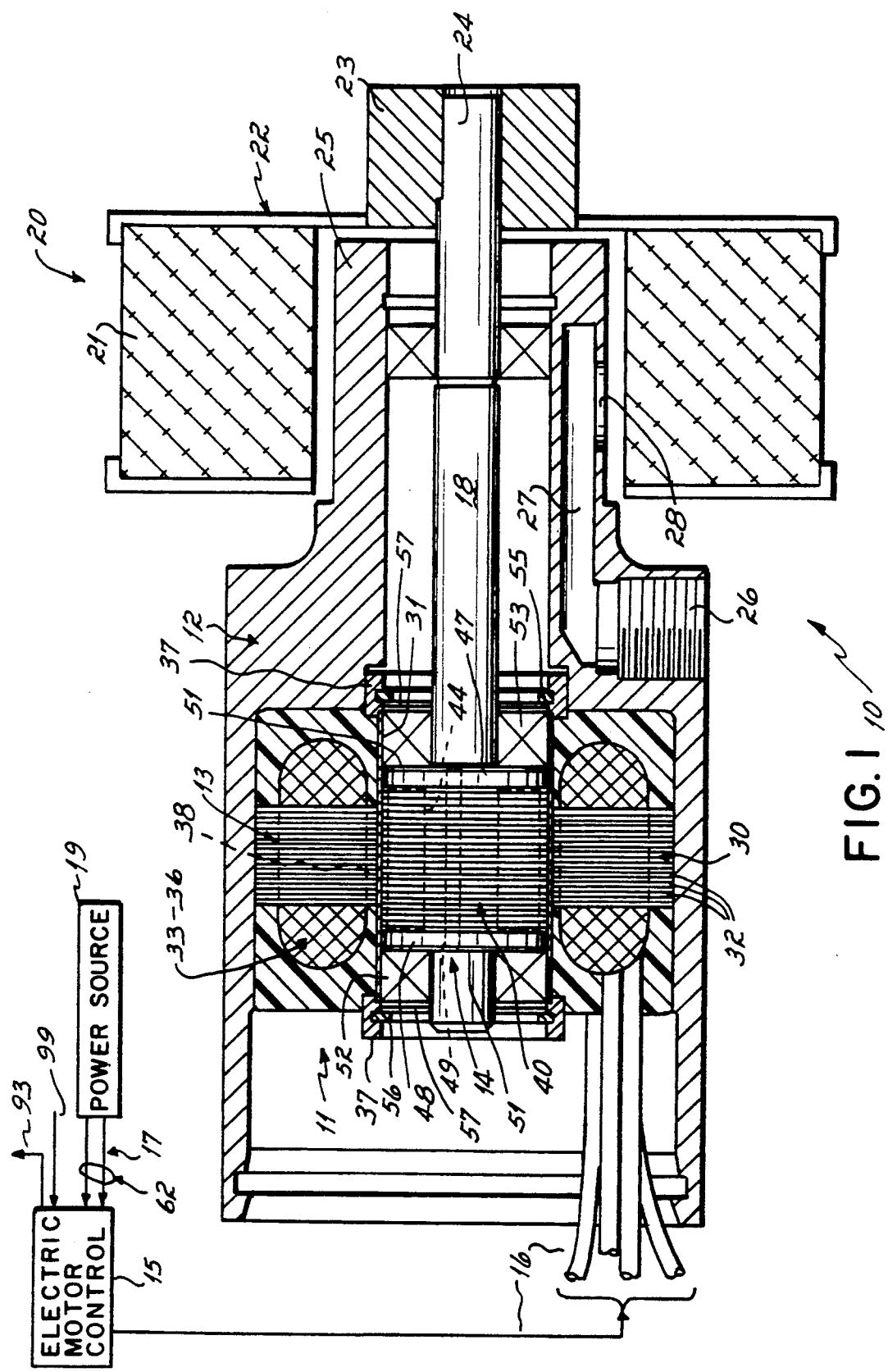
Figure 2:
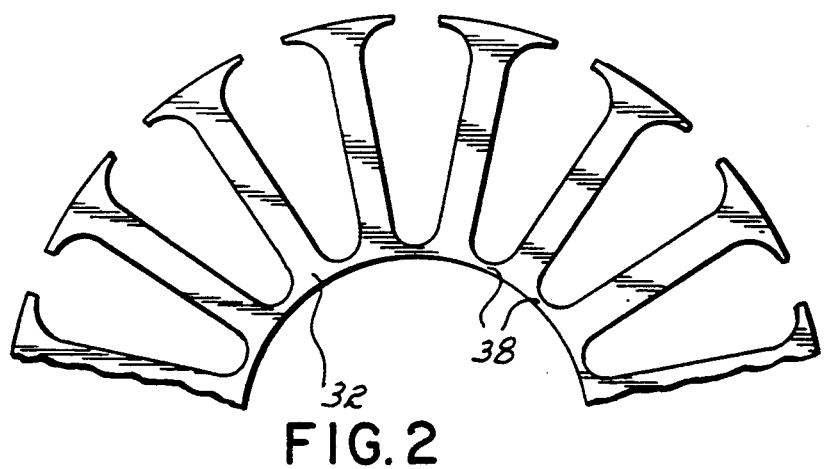

United States Patent [19]

Isaacson et al.

[11] Patent Number: 5,099,182

[45] Date of Patent: Mar. 24, 1992

[54] BRUSHLESS DC MOTOR POWERED FOGGING APPARATUS

[75] Inventors: Milton S. Isaacson; Donald D. Kinsworthy, both of Dayton; Saed M. Mubaslat, Miamisburg, all of Ohio

[73] Assignee: Nu-Tech Industries, Inc., Dayton, Ohio

[21] Appl. No.: 585,881

[22] Filed: Sep. 20, 1990

[51] Int. Cl.$^5$ ............................................. H02P 5/16
[52] U.S. Cl. ...................... 318/254; 318/138; 318/439; 310/156
[58] Field of Search ............... 318/254, 439, 138, 139, 318/767, 778; 239/67–69, 380–389, 461; 310/152–156

[56] References Cited

U.S. PATENT DOCUMENTS

| | | | |
|---|---|---|---|
| 4,027,215 | 5/1977 | Knight et al. | 318/254 |
| 4,107,594 | 8/1978 | Jacobs | 318/254 X |
| 4,238,717 | 12/1980 | Knight et al. | 318/254 |
| 4,492,903 | 1/1985 | Knight et al. | 318/254 |
| 4,804,892 | 2/1989 | Müller | 318/254 |
| 4,918,346 | 4/1990 | Tajima et al. | |
| 5,012,166 | 4/1991 | Ushijima et al. | 318/254 |

Primary Examiner—William M. Shoop, Jr.
Assistant Examiner—David Martin
Attorney, Agent, or Firm—Wood, Herron & Evans

[57] ABSTRACT

A liquid fogging apparatus has a motor which operates from the 12 volt power supply of a vehicle and delivers high torque at high speed, operating aproximately at 0.2 horsepower at 28,000 RPM. A rotating ring of porous ceramic material atomizes the liquid. The motor is small, 1.6" in diameter with a ⅝" diameter rotor. The stator has four phases each preferably containing eight three-turn windings of four strand wire, wound in slots in the outer surface of a short laminated stack, which is reinforced in epoxy with its inner surface honed to minimum thickness to reduce flux leakage. Eight bipolar permanent magnets are set in axial slots of a rotor stack with like poles facing tangentially toward each other around the rotor shaft. A controller commutates the motor sensing back-EMF on the windings to control speed and detect motion during start-up. Start-up is accomplished with a fixed frequency external oscillator which sequentially energizes the coils, followed by DC commutation until the motor accelerates, then pulse-width control of operating speed. The motor drops to an idle speed when the load is removed. An inhibit signal disables the fogger pump if motor speed is too low.

29 Claims, 6 Drawing Sheets

BRUSHLESS DC MOTOR POWERED FOGGING APPARATUS

The present invention relates to DC motor powered fogging devices and more particularly to devices for producing a fog from liquids such as insecticides and which are powered by brushless DC motors energized from conventional vehicle electrical power supplies.

BACKGROUND OF THE INVENTION

Fogging devices are devices which disperse liquids such as liquid insecticides into the air in minute droplets to form a fog or mist. The fineness of the droplets contributes the propensity of the dispersed liquids to remain suspended in the air where, in the case of insecticides, they may contact the largest possible number of insects.

The effective fogging devices are those which produce a fog in the form of a cold liquid mist. These devices usually employ the centrifugal effects of rapidly rotating disk, cone or wafer to atomize the liquid which is pumped against it. Frequently, the rotating device, such as a disk, is provided with a plurality of axially projecting slots or comb-like teeth near the perimeter thereof to break the liquid into the small droplets. The finer and more closely spaced the teeth are, the finer the generated droplets will be.

It has been found that a more suitable and finer fog can be produced by replacing the slotted disk with a porous ring-like material. Effective dispersal of the liquid, however, through such a porous material requires greater centrifugal force than with a slotted or toothed disk. This greater force must generally be produced by a higher rotational speed. Applicants have found that rotating such material at a high rate of speed of, for example, above 23,000 RPM at a speed of, for example, 28,000 RPM will, with a disk of approximately $2\frac{1}{2}''$ in external diameter, produce a superior fog effective for insecticides and many other foggable liquids. Motors which will rotate the fogging disks of porous material at speeds of near 30,000 RPM with sufficient power to disperse the liquid have not been provided in the prior art.

Use of these devices to disperse insecticide along roadways usually requires their mounting on vehicles. Achieving these high rotational speeds and high power has been particularly lacking for vehicle mounted insect fogging devices where electric motors must operate on the power provided by a 12 volt battery or battery powered electrical system of a vehicle. Providing alternative means of powering the motors and employing motors which achieve the power and speed through gearing and other mechanical arrangements present expensive and unreliable solutions to the problem.

Accordingly, there is a need for a high speed electric motor, for example, one which will operate in the vicinity of 30,000 revolutions per minute, which will produce sufficient power, for example, approximately 0.2 horsepower, while operating directly from a 12 volt power supply of a vehicle.

SUMMARY OF THE INVENTION

It is a primary objective of the present invention to provide a liquid fogging device suitable for dispersing a liquid such as an insecticide as a liquid fog, and particularly a device which may derive its energy from a low voltage DC source such as a 12 volt electrical system of an automobile or other such vehicle, and which will deliver high power, for example, 0.2 horsepower, at high rotational speed, such as, for example, 28,000 RPM. It is a particular objective of the present invention to provide such a fogging device with a brushless DC motor which will operate from a 12 volt vehicle electrical system to deliver such high torque at such high speed.

According to the principles of the present invention, there is provided a liquid fogging device having a rotatable fogging element onto which is fed a liquid to be fogged. The rotatable element is powered by a high speed motor which operates at high torque, and does so when energized by a low voltage DC electrical source. According to the principles of the present invention, the motor of the fogging device develops its high power and high speed from a design which is exceptionally small, utilizing a combination of features yielding the intended results.

In accordance with the preferred embodiment of the present invention, there is provided a brushless DC motor which operates at the speed of above approximately 23,000, such as at 28,000 RPM, while employing at least 6 and preferably 8 pole construction in a high efficiency design. The motor, according to the preferred embodiment of the invention, incorporates a rotor having eight bipolar magnets with poles opposing each other and oriented around the circumference of the rotor. The magnets are coupled with a stator having four phases each containing eight coils wound with three turns per coil made with four strand wire wound about core material in radial slots from the outside of a short laminated stack. In the preferred embodiment, the stator stack is approximately $\frac{3}{8}''$ in length and approximately 1.6'' in diameter, with the rotor containing eight magnets of approximately $\frac{1}{2}''$ in length in a laminated rotor stack approximately 0.55'' long and approximately $\frac{5}{8}''$ in diameter. Because the stator is wound from the outside, a bridging ring of core material surrounds the rotor. This bridging ring is honed to a very thin thickness after the stator is wound and encapsulated in plastic material, preferably epoxy. The honing enhances the alignment of the rotor shaft bearings so that the rotor is maintained with a very small air gap between it and the inside of the stator, thereby improving the magnetic interaction between the rotor and stator and increasing the output and efficiency of the motor.

The preferred motor is a brushless DC motor which employs a technique of sensing the back EMF on the stator windings to derive signals for commutating the motor, and employs pulse width energization of the coils for motor speed control by varying both the torque angle and pulse width by advancing or retarding the leading edge of the power pulse to maintain the motor speed. Such a motor control technique is disclosed in U.S. Pat. No. 4,027,215 of John H. Knight and Milton S. Isaacson, hereby expressly incorporated herein by reference.

The preferred control of the motor includes the use of a starting sequence which will generate a high starting torque. The motor winding has four separately powered phases each powered by a power MOSFET circuit. The starter control generates a power pulse and delivers it to one of the coils. The control then senses the back EMF on the windings to determine whether the motor is rotating at sufficient speed and in the correct direction. Once movement in the correct direction is detected, the series of pulses is generated until the motor has accelerated sufficiently for the motor commutation to be sustained with DC motor commutation control. However, unless and until the motor movement is detected and the motion is in the correct direction and if adequate speed to shift to a DC mode of operation, a microprocessor in the control circuit sequentially fires pulses to the next coil in the sequence at a predetermined start-up frequency.

The control circuit, according to the preferred embodiment of the present invention, also produces an alarm signal when the motor speed drops during normal operation to below some predetermined speed, for example, 23,000 RPM, below which speed efficient fogging is not expected to occur. In addition, in order to allow the motor to operate intermittently, as is necessary in many insect fogging and other fogging applications, rather than switching to an off state the motor is switchable to an idle speed of, for example, 15,000 RPM whenever the liquid pump is deactivated. Other features which protect the device include (a) a motor shut off should voltage exceed some high limit of, for example, 15 volts, (b) a temperature cut off in the event that overheating is detected, and (c) the speed control feature which maintains the motor at a substantially constant speed over a voltage range of say for example 10-14 volts and over a torque range of for example 0-6 ounce inches.

The present invention provides the advantage of a motor which develops high torque at high speeds, for example 0.2 horsepower at 28,000 RPM. The device of the present invention also operates to disperse a fine liquid fog or mist, and does so only when the fogging device is operating at an optimum speed over the given voltage and torque range. Should the device fall outside of the optimum operating range, a signal effectively deactivates the liquid pump, thus stopping the pumping of liquid to the fogging device when it is rotating too slowly for the spray to be expected to be effective. The ability to intermittently operate the fogging device by rapidly switching it on and off without starting and stopping the motor renders the device effective for avoiding spraying upon people and houses as a vehicle which carries a fogging device is moving along a roadway at a more or less constant speed.

These and other objectives and advantages of the present invention will be more readily apparent from the following detailed description of the drawings in which:

FIG. 1 is an axial cross section of a liquid fogging device in accordance with the principles of this invention.

FIG. 2 is a fragmentary enlarged plan view of a stator lamination.

FIGS. 3A and 3B are schematic representations of the method for winding a stator in accordance with the principles of this invention.

FIG. 4 is an enlarged schematic of a rotor lamination, the pole magnets being shown in cross section.

FIG. 5 is a block diagram of the control circuit for the fogging device of FIG. 1.

FIG. 6A, 6B and 6C are portions of a flowchart of the operation of the device of FIG. 1 under the control of the program of the microprocessor of the circuit of FIG. 5, with FIG. 6A representing the START-UP mode of the program, FIG. 6B representing the DC mode of the program and FIG. 6C representing the SPEED CONTROL mode.

DETAILED DESCRIPTION OF THE DRAWINGS

Referring to FIG. 1, a liquid fogging device 10 embodying principles of the present invention is illustrated. The fogging device 10 includes a motor 11 mounted within a housing 12. The housing 12 is adapted to be mounted in a stationary manner with respect to the frame of an automotive type vehicle. The motor 11 includes a stator assembly 13 supported on the stationary housing 12, a rotor assembly 14 rotatably mounted in the stator assembly 13, and an electric motor control 15 adapted to also be supported on the vehicle frame remote from the motor and housing 12. The motor 11 is connected electrically to the control 15 by a wire set 16 from the stator assembly 13 of the housing 12. The control 15 is connected to a panel (not shown) and power source 19 of the vehicle through a wire set 17. The rotor assembly 14 includes a shaft 18 located on the axis and mounted to rotate with the rotor assembly 14.

Mounted at the end of the shaft 18 of the fogging device 10 is a wheel-like atomizing cylinder 20 which includes a porous annular disk or ring 21 and a supporting disk 22 having a central hub 23 which mounts to a remote keyed end 24 of the shaft 18. The annular disk 21, being of porous material preferably an open cell ceramic foam, about 4 mm thick and with cells of from 150 to 200 microns in diameter. Such a ceramic may be, for example, an aluminum oxide material of the approximately 20% alumina with various percentages of stabilizing zirconia, titania and manganese dioxide.

When the disk 21 is rotated upon the shaft 18 at high speed of about 28,000 RPM, it will effectively atomize a liquid such as an insecticide pumped into the interior of the disk 21 into a very small droplets to produce a fog which will remain airborne long enough to contact the largest possible quantity of flying insects. The rotating disk 21 has an inside diameter larger than a neck portion 25 of the housing 12 and extends around the housing neck portion 25. Housing 12 includes a liquid inlet port 26 through which the liquid to be sprayed is communicated along a duct 27 through outlet ports 28 in the housing neck 25 from which it flows onto the inner surface of the porous ring 21 to propagate therethrough by centrifugal force and be ejected therefrom in the form of the fog or mist. The end 24 of the shaft 18 is supported in the housing 12 by a ball bearing 29.

The motor 11 is of a design which renders it capable of providing the needed high rotational speed, as for example 28,000 RPM, and of delivering power required with voltage available from a conventional 12 volt electrical system of an automotive type vehicle. The motor 11 itself, according to the principles of the present invention, is very small, being typically only approximately 1.6 inches in diameter, approximately 1.145 inches in length, and develops approximately 0.2 horsepower at 28,000 RPM when operating at 12 volts DC.

The design of the motor 11 which renders it particularly capable of producing the power required and the required speed with a 12 volt power source is in part due to the design of the stator assembly 13, the rotor assembly 14 and the control 15, and to the manner in which the rotor assembly and stator assembly 14 and 13, respectively, are combined in the motor 11. The motor 11 is a 8 pole motor and provides the necessary high torque and, in addition, operates at very high speed. Typically, an 8 pole motor is suitable for providing higher torque than motors of fewer poles, but an 8 pole motor is not typically employed for high speed operation. The relationship of the motor RPM to the number of poles is typically expressed as RPM=(120×F)/P where P is the number of poles, and F is the commutation frequency in Hertz. Accordingly, the motor 11 illustrated and described, which is a brushless DC motor design, requires a commutation frequency of approximately 1867 Hz.

The stator assembly 13 includes a stator lamination stack 30 and a internal stator sleeve 31. The lamination stack 30 is formed of a plurality of laminations 32 each nominally 0.014 inches thick, and preferably 27 in number. With thickness variation of 10%, the quantity of the laminations 32 which are needed may vary in number from 24 to 30 such that the lamination stack 30 will total 0.375 inches in thickness prior to receiving a coating. The laminations are generally circular disks having an internal diameter of 0.6235 inches, an outside diameter of 1.4467 inches and 16 radial slots extending inwardly from the outside rim of the laminations. These slots penetrate to 0.010 inches from the inside of the disk.

The laminations 32 are formed of M15 electrical steel and coated with Corvel epoxy coating and bonded together. Sleeve 31 is press fit within the lamination stack 30 and has an internal diameter of 0.6220 inches.

Figure 3A:
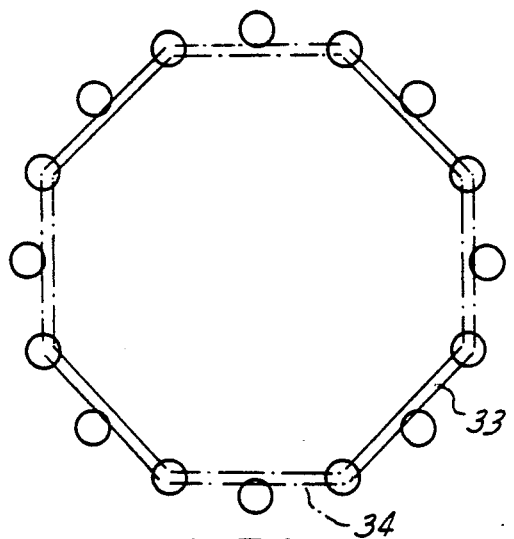
Figure 3B:
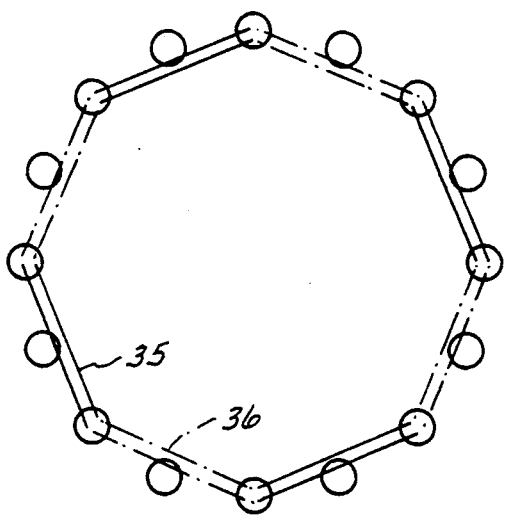

The stator 13 is wound with four phases containing eight coils with three turns each. In order to provide the current carrying capacity required and the ability to be wound on the small stator core, the wire for each of the windings is a four strand or quadrafilar wire, each strand being of No. 22 gauge. The windings are each fitted in alternate ones of the 16 slots, each using 8 slot sets. As such, wire windings of opposite phases will use the same 8 slots, each containing coils wound clockwise and counterclockwise. Thus a total of 4 phases are provided. The four phases are illustrated as 33-36 in FIGS. 3A and 3B.

In order to resist the corrosive environment of insecticide spraying, the motor windings are completely encapsulated in epoxy to isolate them from the corrosive environment. The encapsulating employed is material such as Stycast No. 3050 epoxy. The plastic epoxy material or other suitable material is preferably formed by injection molding. Encapsulation traps the individual wires in the winding preventing them from rubbing against each other or the motor housing, and also improves the integrity of the sleeve 31 that supports the bearings.

To hold bearings in exact axial alignment for high speed assembly, the bearing support sleeves 31 are assembled to the stator laminations before the windings 33-36 are applied. A pair of sleeve end rings 37, 37 is provided on the opposite ends of the sleeve 31. After the winding operation is completed and the stator encapsulated, the bore of the sleeve 31 is honed out to a diameter necessary to ensure exact alignment of the inside diameters of the sleeve 31 and end rings 37. This honing assures that, when the rotor 14 is inserted within the sleeve 31, the entire rotating assembly is in exact axial alignment with the stator bore and bearing support bushings. The honing operation also contributes to the high output and high efficiency of the motor 11 by maintaining a precise and very small air gap between the rotating rotor 14 and the sleeve 31 of the stator 13. The honing operation also reduces bridge ring portion 38 of the stator laminations 32 at the inside of the stator 13 in order to render essentially negligible the capacity of the bridge ring 38 to reduce the stator flux density.

The bridge ring 38 reduces parasitic hysteresis losses thereby improving motor efficiency by its presence.

Figure 4:
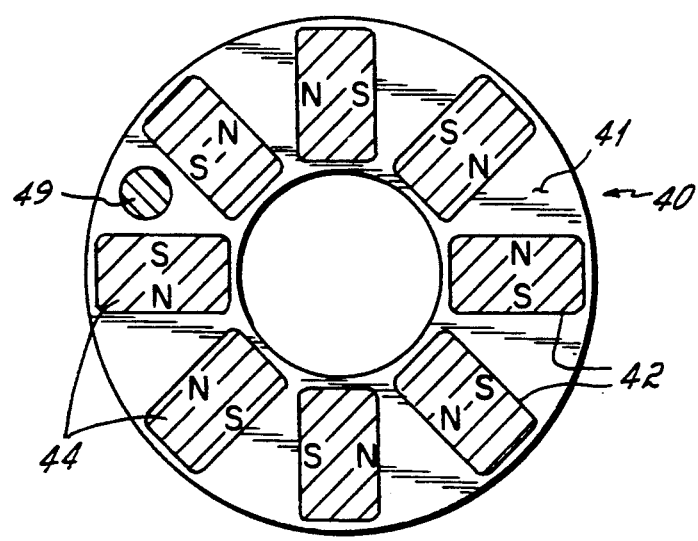

The rotor 14 includes the shaft 18 and a rotor lamination stack 40. The lamination stack 40 is also formed of a plurality of laminate plates 41, each 0.014 inches thick, and preferably stacked 39 in number. Should the thicknesses deviate by as much as 10%, the number of laminations would be selected in the range of from 35 to 43, so as to form a rotor stack of approximately 0.546 inches in height. As best seen in FIG. 4, the rotor laminations 41 are circular disks and have an outside diameter of 0.614 inches and an inside diameter of 0.255 inches to snugly fit over the shaft 18. Each of the disks has through it 8 axial slots 42, rectangular in cross section, and oriented to project radially at fixed equal angular spaces about the circumference of the disks to within 0.008 inches of the outer edge and 0.009 inches of the inner edge. Eight magnets 44 are provided, each 0.090 inches thick in the circumferential direction and 0.154 inches wide in the radial direction. The magnets 44, each ½ inch in length, are positioned in the slots 42 of the rotor lamination stack with their poles facing the tangential or circumferential direction of the rings alternating north-to-north and south-to-south. The magnets oriented such that the northern pole of one magnet faces the northern pole of the next with the southern pole facing the southern pole of the next and opposite magnet around the rotor. Each of the magnets 44 has a north pole and a south pole as designated N and S respectively in FIG. 4.

A pair of retaining disks 47 and 48 are positioned on opposite sides of the lamination stack 40 about the shaft 18. A retainer rod 49 is press fit into a small hole through the lamination stack 40 and through inside bearing retainer rings 47 and 48 to hold the assembly together in alignment. Shim 51 are positioned about the shaft 18 on opposite sides of the rotor stack 40. Against the shims 51, a pair of ball bearings 52 and 53 are positioned about the assembly on each side of the lamination stack 40 around the shaft 18.

The magnets 44 are rare Earth magnets which produce high flux density. The magnets 44, because they are contained in the slots 42 rather than being otherwise attached to the surface of the rotor, are constrained against a tendency to fly off the rotor due to centrifugal force produced by the high speed of the motor which will be attained.

The rotor assembly 14 together with the bearings 52 and 53 are assembled within the stator bore and held in position by a pair of outside bearing retainer rings 55 and 56 which snap fit into grooves in the ring section 37, 37 of the sleeve 31 with the rotor assembly held in position axially between the outer rings 55 and 56 and inner rings 47 and 48, with such spacer rings 57 as are needed to fill the space.

Figure 5:
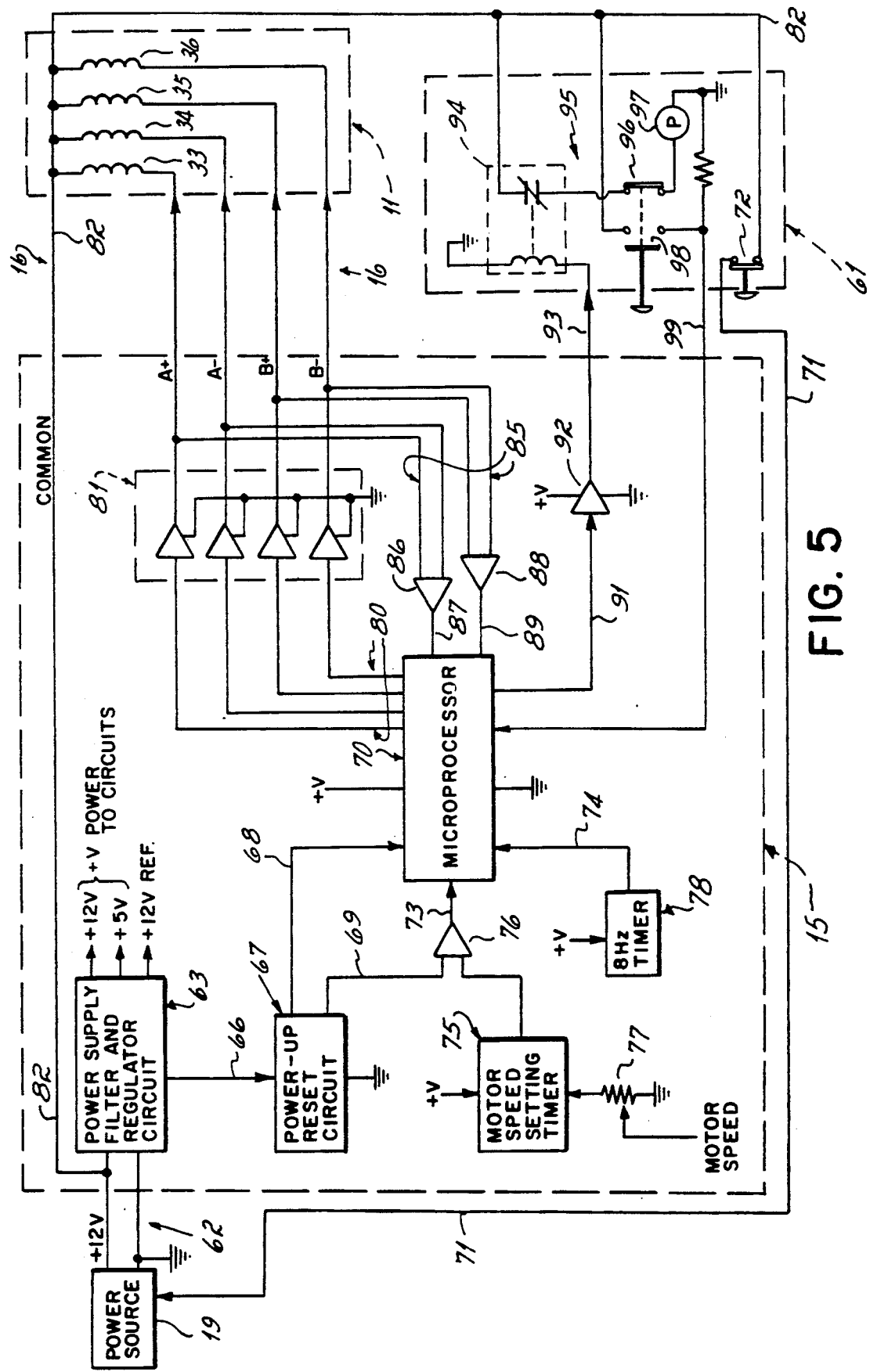

The electrical circuitry of the fogging device 10 of FIG. 1 is illustrated in the block diagram of FIG. 5. This circuitry includes the electrical circuitry of the controller 15, the motor windings 33-36, the fogging device motor 11, a fogger device control circuit 61 and 12 volt power source 19 of the vehicle.

Power leads 62 from the 12 volt battery of the vehicle connect to the power supply filter and regulator circuitry 63 which provides appropriate voltage outputs at regulated reference levels to the various components of the control circuit described. The power supply 19 is connected through an output 66 to a power-up reset circuit 67 which has a pair of outputs 68 and 69 on which it generates power-up signals employed to ensure that a program in a microprocessor 70 starts properly at its beginning when the power is first applied to the control 15. The output 68 is connected to a reset input of the microprocessor 70. The output 69 is explained below. A power on/off signal line 71 is connected between the power source 19 and an on/off switch 72 in the fogger control 61 to turn the control and the fogging motor on and off. The power up circuitry 67 operates in response to turning on of the control 15 by application of a signal through the line 71.

The microprocessor 70 contains an operating program by which the commutation of the windings 33-36 of the motor 11 is controlled. This program is described with the flowchart of FIG. 6 below. The microprocessor 70 may be any suitable programmable microprocessor. Motorola Series 6800 microprocessors, such as for example Motorola 68HC11 have been found suitable. In addition, the Hitachi HD637B01 and HD637C01 have been also found suitable.

The microprocessor 70 controls the commutation of the motor 11 utilizing two inputs 73 and 74 from two timers. The input 73 accepts a motor speed setting square wave output from a variable motor speed setting timer 75 which has its output connected to an input of a two input comparator amplifier or gate 76 having its other input of the output 69 from the reset circuit 67, and its output connected to a microprocessor input 73. The motor speed setting timer 75 has a frequency controlled by the setting of a variable motor speed setting potentiometer 77 through which the operating speed of the motor 11 may be manually set. The amplifier or gate 76 serves to ensure that the motor speed signal does not reach the microprocessor before the power up reset circuit 67 has set the microprocessor 70 to its starting position in its program.

The microprocessor 70 has an input 74 connected to the output of a timer 78. The timer 78 generates an 8 Hz signal which is used by the microprocessor 70 during motor start up as will be explained more fully below.

The microprocessor 70 has four outputs 80 each connected to a respective one of four power amplifier circuits 81. The circuits 81 are fast switching low ON-resistance transistors. In the specific and preferred embodiment, these transistors include a pair of N-channel MOSFETs type 1RFZ44. The outputs of the amplifiers 81 are connected through the leads 16 to the windings 33-36 respectively of the motor 11. In addition, a common lead 82 from the 12 V positive power inlet line 62 is connected through one of the leads 16 to a common connection node of the windings 33-36 of the motor 11.

The motor 11 is a brushless DC motor. Accordingly, position sensing is provided for the microprocessor 70 to perform its motor commutation function. For this purpose, a plurality of four leads 85 are connected from each of the output leads 16 to the windings 33-36, respectively, to deliver the signals responsive to the back EMF on the motor windings. In this respect, the opposite phase windings 33 and 34 have each a corresponding signal lead of the connector set 85 connected to an opposite one of the inputs of a differential amplifier 86 to a back EMF input 87 of the microprocessor 70. Similarly, the opposite phase windings 35 and 36, which are 90° out of phase respectively from the windings 33 and 34, each have a corresponding signal lead of the connector set 85 connected to an opposite one of the inputs of a differential amplifier 88 which is connected to another back EMF input 89 of the microprocessor 70.

The microprocessor 70 generates an output digital signal on an output line 91 through an amplifier 92 to a minimum threshold speed output line 93 connected to a relay 94 in the pump circuit 95 of the fogger control 61. Connected in series with the contacts of the relay 94 in the pump circuit 95 is a pump on/off switch 96 for controlling the operation of the pump 97 which delivers the insecticide or other fogging fluid to the liquid inlet 26 (FIG. 1) of the fogging device 10. This switch 96 is ganged with a switch 98 for delivering a motor idle control signal on an input 99 to the microprocessor 70. The input 99, the speed signal output 93, and the power lead 62 are included in the wire set 17 (FIG. 1) connected from the controller 15 to the fogging device control 61 and power leads of the vehicle.

The signal at line 93 operates to enable the fogging device pump 97 to operate only when the motor speed has attained some predetermined speed, as for example, 20,000 revolutions per minute. The reason for this is that effective fogging can only take place when the motor is operating at least some minimum speed required to atomize the liquid. The idle input switch 98 operates to drop the speed of the motor to some idle speed, say 15,000 RPM, when the pump is not operating and fogging liquid is not being delivered to the fogging device 10. This prevents the need for constantly stopping and restarting the motor by allowing it to idle at a speed from which it can very quickly be accelerated to operating speed. Operating speed, as controlled by the motor speed setting timer 75 is typically 28,000-30,000 RPM.

Figure 6A:
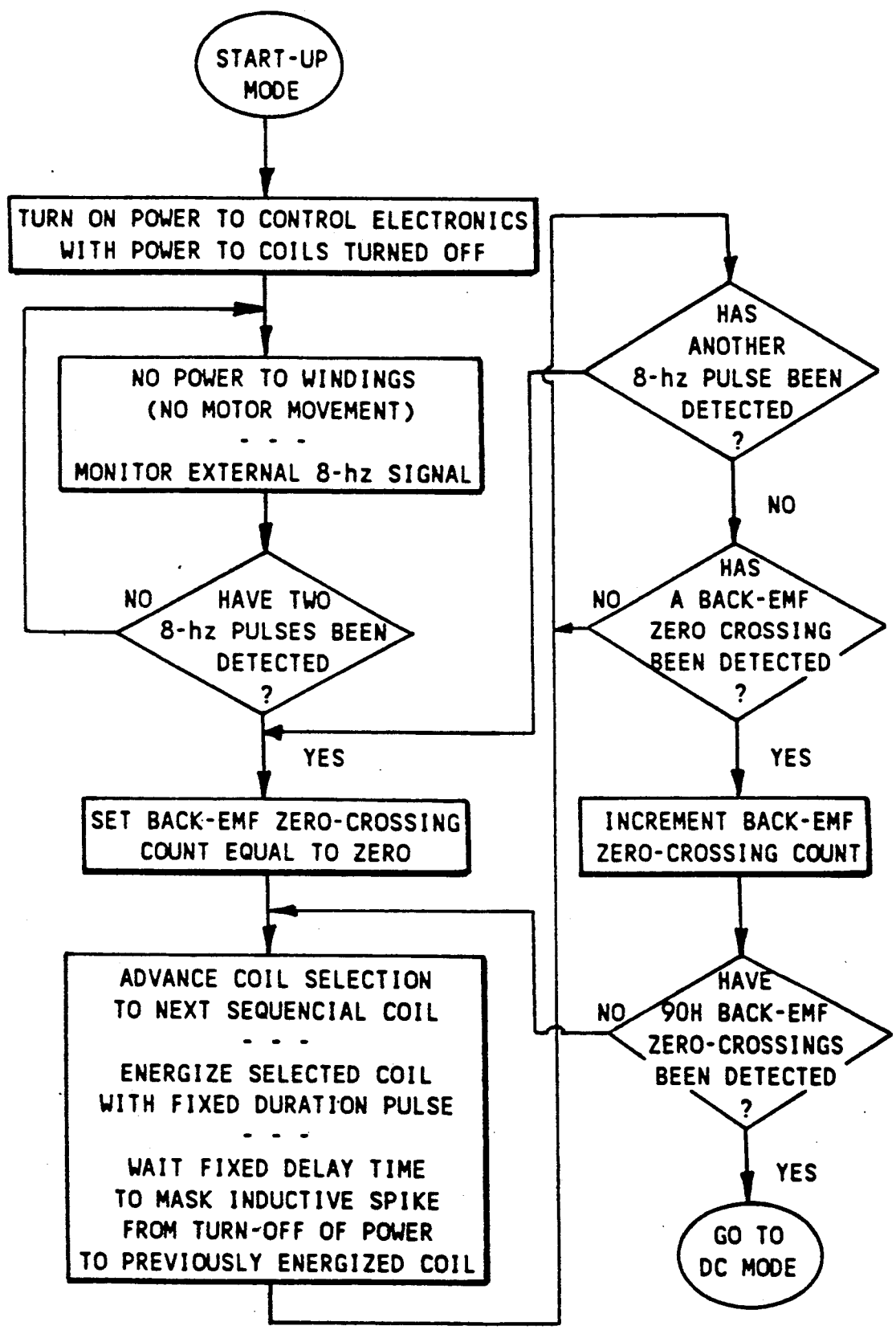
Figure 6B:
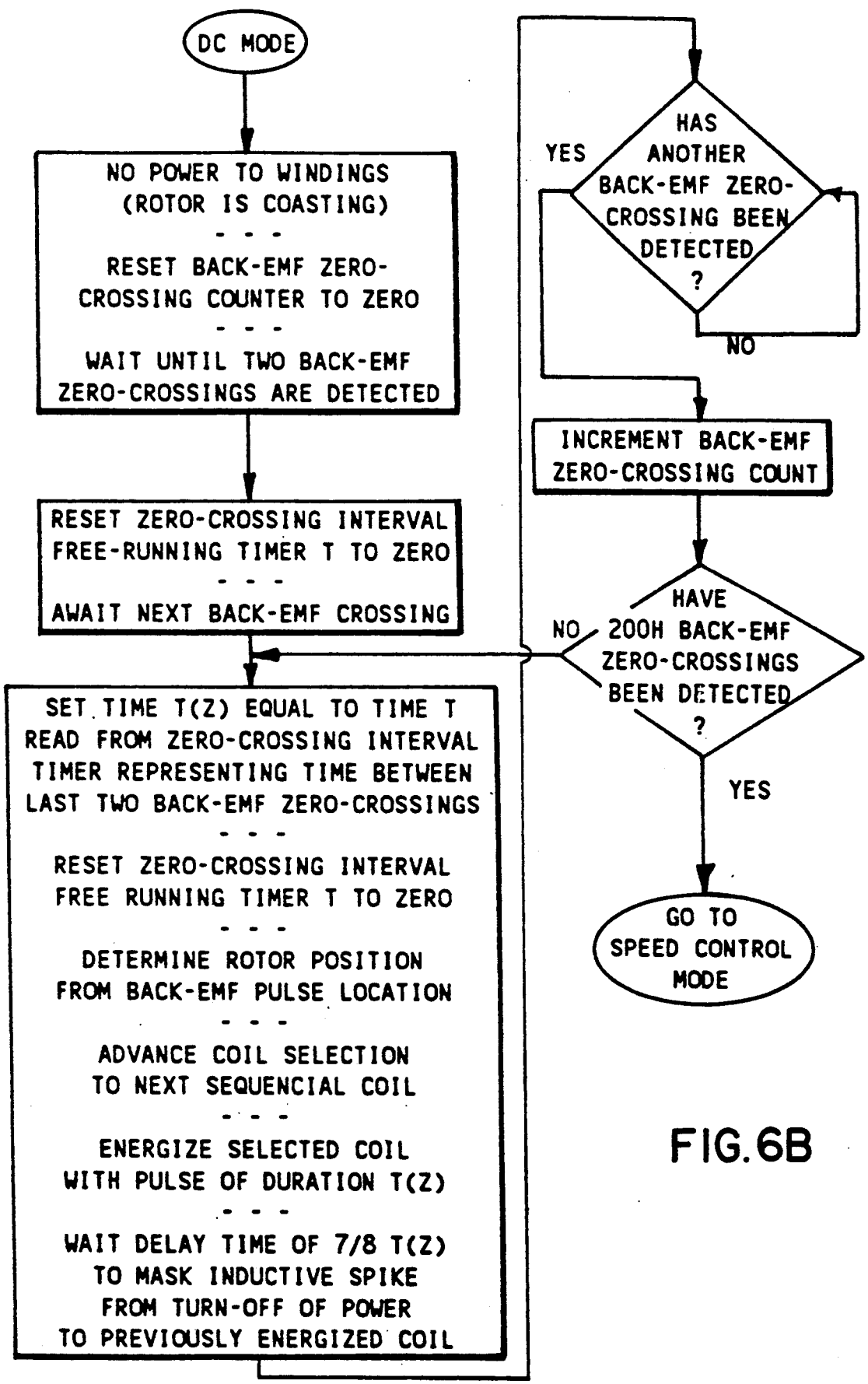
Figure 6C:
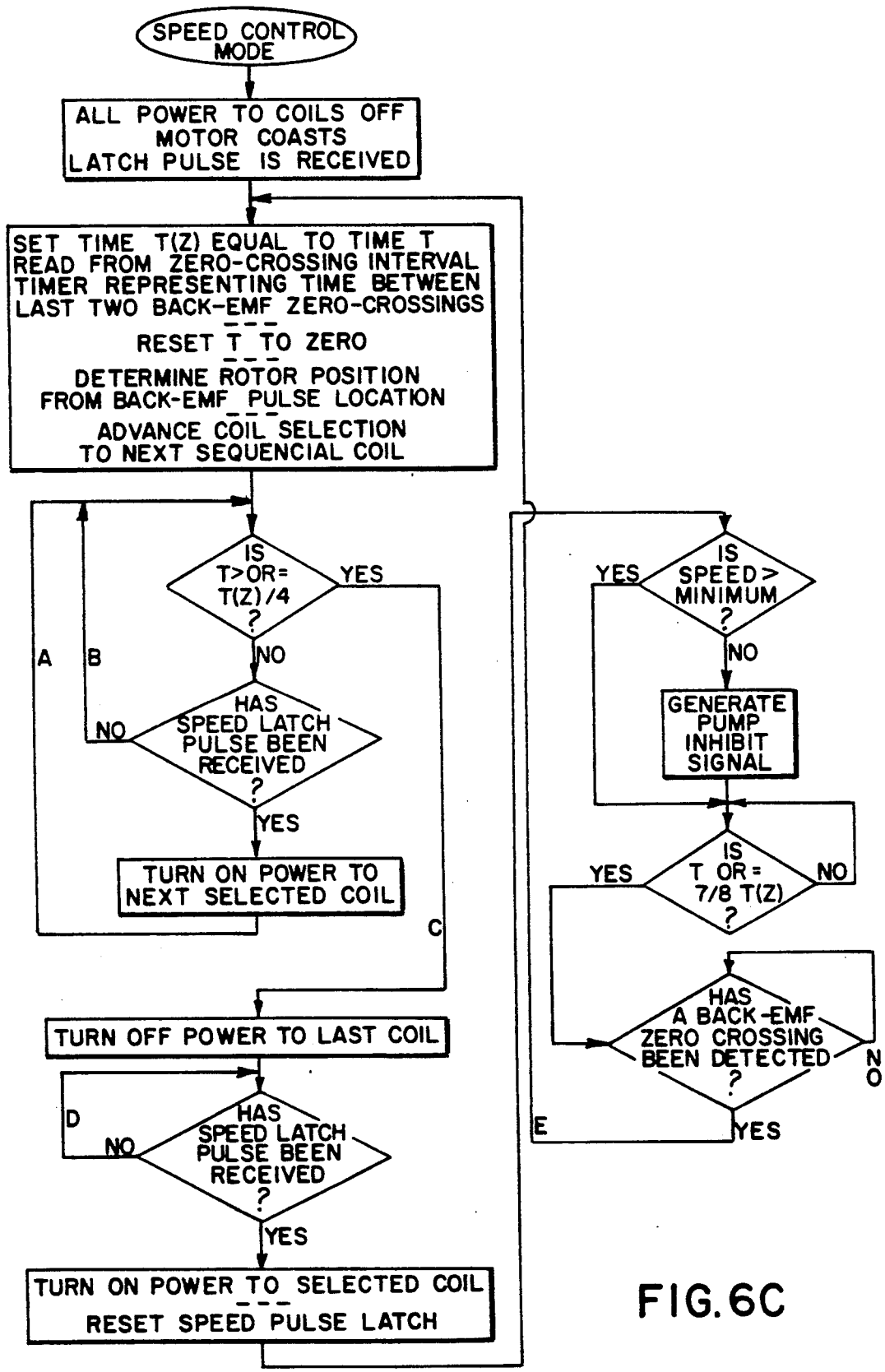

The operation of the controller 15 can be better understood by reference to the circuit of FIG. 5 and to the flowcharts of FIGS. 6A-6C which represent the program of the microprocessor 70. When a POWER-ON signal through line 71 activates the power supply 19, the power up reset circuit 67 is activated by a signal on line 66 to reset the microprocessor 70 and begin the program at the START mode of the flowchart of FIG. 6A. At such time, no power will be applied to the windings FIG. 33-36 of the motor 11. The timer 78 will begin to generate square wave pulses at a frequency of 8 Hz. The program thereupon awaits receipt of two 8 Hz pulses from the timer input 74 of the microprocessor 70 in order to synchronize the running of the program with the motor position. Then, the program enters a start-up loop.

Upon receipt of the two 8 Hz pulses, the microprocessor 70 first advances control to the first coil, the coil 33. The program then resets a back EMF counter which counts time increments of the free running clock of the microprocessor 70 to time the duration of the time interval between zero crossings of a back EMF signal at the input lines 87 and 89 to the microprocessor 70. Then, the microprocessor 70 causes power to be applied to one coil, in the first instance, the selected coil 33 which is the A+ phase coil. Thereupon, a time delay inhibit signal is generated to inhibit the microprocessor 70 from misinterpreting inductive spikes and other noise likely early in the interval following the powering of a coil as the back EMF signal at inputs 87 and 89. After the time delay expires, the microprocessor checks to determine whether a back EMF signal has been received from the lines 87 or 89, and, if none has been received, then the microprocessor 70 checks to see whether, in the meantime, another pulse from the 8 Hz timer 78 has been received at the microprocessor input 74. If neither a back EMF signal nor an 8 Hz signal has been received, the microprocessor 70 repeatedly loops through these two tests to wait until either one of the two signals has been received.

If an 8 Hz signal is received before back EMF is detected, the implication is that miscommutation has occurred. This means that either the motor 11 has begun to rotate in the wrong direction, has not rotated at all, or has moved in an oscillatory manner and failed to rotate in the forward direction. Should this occur, control is returned to the portion of the flowchart wherein the power is advanced to the next coil in the sequence, specifically, coil 35 which is the B+ phase coil, which is 90° behind the A+ coil 33. Again, the timer for timing the zero crossing of the back EMF signal is set to zero and power is applied to the next motor coil being now the A− phase coil 34. This start-up loop continues stepping through the coils until a back EMF signal is detected.

When a back EMF signal is detected at the time following the application of power as determined by the expected spike inhibiting time delay, the back EMF count is incremented by a count of ONE as program control enters the initial acceleration phase under DC control portion or subloop of the start-up mode. Power is advanced to the next coil in the sequence which follows the last energized coil and a check is made to determine whether 90 HEX (decimal 144) back EMF pulses have been thus far detected. Awaiting the 90th HEX pulse will allow sufficient time for the motor to have accelerated enough to proceed to control under the portion of the program set forth in FIG. 6B. If the 90 HEX count has not been reached, control is returned to apply power to the selected coil and then to await the next back EMF pulse. Should further pulses fail to occur before the 80 Hz signal is received, then the program will re-enter the start up loop. Otherwise, upon receipt of the back EMF pulse, the count will be incremented and the initial subloop of the DC mode will continue until a 90 HEX count of back EMF pulses has been received, whereupon control will move to portion of the flowchart of FIG. 6B wherein the counter for back EMF pulses is again reset to zero.

In that the motor 11 is now running with some small level of momentum in the forward direction, upon transfer to the DC mode, the program allows the motor to coast with no power to the coils. This coasting is continued at this point with the program waiting for the first three back EMF pulses to be received. When three signals have been received, the memory is advanced to select whichever coil is next in the sequence to which power is to be applied at one of the outputs 80 from the microprocessor 70. The determination of the rotor position is made by sensing the location and sign of the last pulse on the input lines 87 and 89. During this process, the time between the zero crossings of the back EMF signal pulses is measured. This measurement is made by counting the number of timing pulses from the internal free running clock of the microprocessor 70 during the interval between the zero crossings. This time between zero crossings is used to time the firing or powering of the next coil. The firing or power-on time for the pulses to the coils is selected to be at the beginning of zero crossings as so timed. Once this next coil is energized, a back EMF pulse is again awaited and, when it is detected, a count of back EMF pulses is incremented. Until this count reaches an additional 200 HEX (while in the DC mode), this loop portion of the DC mode continues with the control returning to the portion of the program which measures the time between zero crossings of the back EMF pulse which is used to preset the next pulse width. Coil selection advances the power to the next motor coil in the sequence. When the 200 HEX count has been reached, it is determined that the motor has accelerated sufficiently close to operating speed that the speed control portion of the program can take over as described in connection with the SPEED CONTROL portion of the flowchart of FIG. 6C.

Referring to FIG. 6C, when entering the speed control mode, all power is turned off and the motor coasts long enough to insure that a latch signal is received from the timer 75. For a 30,000 RPM setting, this timer is running at 8 KHz producing pulses at a 0.125 msec rate. The signal from the speed control oscillator 75 determines the time interval for the motor to rotate to the position for the firing of the pulse to the next coil, which will be 1/16 of a mechanical revolution of the motor. Receipt of a latch signal will insure that power to the next coil will be turned on at first opportunity under path A discussed below. Then, a value T(Z) is set to the time of the actual interval between the last two detected zero crossings and stored in the memory of the microprocessor 70. In addition, ¼th of this time is computed and a value T(Z)/4 is stored as well as a computed value for a time delay window which is set at ⅝ths of the time T(Z) between the last two zero crossings.

Each time a zero crossing is detected, a code is stored indicating the position of the rotor by reading the sign of the back EMF signal and the line 87 or 89 and noting the one of the lines on which it is received. Then the coil selection is advanced to the next coil in the sequence.

Then, a check is made to determine if the lapse of ¼ of the last measured time between zero crossings has passed since the last coil was energized. This is the pulse overlap time during which two consecutive coils are both energized. On the first execution of the speed control mode loop, T will be less than T(Z)/4. Also, the speed latch signal from the timer 75 will have been received. Therefore, loop A will be immediately executed as the power to the selected coil is turned on and the program loops again to check for time T(Z)/4. This loop A tends to widen the pulse width, as it will do whenever the motor is running slower than the set speed.

The time T(Z)/4 is the time since the last back EMF signal zero crossing has been detected, or 1¼ times the back EMF zero crossing interval since the power to the previous coil had been energized. That is the time at which power to that coil is to be turned off to overlap pulses so as to provide that each coil is energized at 112.5 electrical degrees when the motor is running at the set speed. Whether or not the next coil is, or has been, turned on, the program loops to determine whether T(Z)/4 has occurred in order to determine when to turn off the previous coil.

In passes through this portion of the program on subsequent cycles, the program will cycle on loop A waiting for T(Z)/4 whenever the motor is running at less than the set signal and through loop B whenever the motor is running at greater than the set speed of timer 75. Only when the motor is running at much more than the set speed will T(Z)/4, and thus branch C, be executed, turning off the power pulse to the last energized coil before power to the next coil is turned on via loop A. In such event, and only in that event, will the program dwell at loop D before turning on power to the selected coil. Otherwise, the D loop is bypassed. In such event, the power to the selected coil will probably already be ON. At this point, the microprocessor resets the latch so that the next pulse from counter 75 can be received.

Next the microprocessor 70 checks the time between zero crossings which was last measured to determine the actual motor speed for output or monitoring purposes. If the speed is too slow, an alarm or inhibit signal prevents activation of the pump 97 by generating an inhibit signal on line 93. This inhibit signal will endure until the speed of the motor has risen.

Whenever the coil has been turned off, it is necessary to wait out the passage of a time period, represented by a time window which has been set to ⅛ T, in order to mask the inductive spikes that occur. Thus, a loop is executed until the window has timed out. Once the power to the next coil has been turned on, the power to the last coil has been turned off, and the window ⅛T has passed, the control passes through the bottom of FIG. 6C of the flowchart where the program loops until a zero crossing is detected, as represented by path E. If the motor is running faster than the set speed of timer 75, loop E will execute before the latch signal is received and loops B and/or D will then be executed on the next cycle and the program will then await the latch signal. Otherwise, the latch pulse will have been received before the zero crossing is detected and, in the next cycle, loop A then branch C will be executed, by passing loops B and D.

The motor speed control concept is the pulse width and torque angle speed control concept for brushless DC motors of the type employed in the Knight U.S. Pat. No. 4,027,215. In certain embodiments of the invention, other forms of a motor position sensor such as a Hall device may be used.

Having described the invention, its embodiments and additional details, devices and methods relating thereto, the following is claimed:

1. A liquid fogging device comprising:
   a rotatable ring of porous material having an interior inlet connectable to a source of liquid to be fogged and an exterior surface for dispensing fogged liquid, the material being of such size, shape and porosity as to possess the capability of centrifugally transferring liquid from the inlet to the outer surface in the form of minute fog-like droplets when rotated above a predetermined rotational speed in the range of from approximately 23,000 to approximately 30,000 RPM;
   a brushless DC motor having means for delivering approximately 0.2 horsepower at approximately 28,000 RPM when energized from a 12 volt DC source, said means including a housing, a stator supported by said housing, and a rotor rotatably mounted for high speed rotational movement within said stator;
   said stator having a plurality of multipole DC windings each selectably electrically connectable to a source of power;
   said rotor having an output shaft drivably connected to said ring and a plurality of permanent multipole magnets contained therein and spaced around said shaft;
   controller means for energizing said motor from a source of DC power by selectively connecting said windings thereto, said controller means including means for commutating said windings by timing and sequencing power pulses thereto to rotate said motor to and in the range of approximately 23,000 to 30,000 RPM.

2. A small, high torque, high speed, brushless, low voltage DC motor for a liquid fogging device capable of dispensing fogged liquid, said motor comprising:
   a stationary stator assembly having a plurality of axial slots spaced therearound and a plurality of different phase multi-pole electromagnet windings wound in said slots;
   a rotor assembly rotatably mounted for high speed rotational movement within the stator assembly and having an output shaft and a plurality of bipolar permanent magnets spaced thereon around said shaft; and,
   a controller having power input conductors connectable to a low voltage DC power source and output conductors connected to said windings, said controller including power means for selectively applying power pulses to said windings, feedback means for sensing the position of said rotor, and commutation means for timing said power means in response to said feedback means to operate said motor at high rotational speed;
   said commutation means including programmed start-up means which includes means for causing said power means to apply an initial pulse to one of said coils, means responsive to said feedback means for detecting a minimum rotation in a predetermined direction as a result of said initial pulse, and means responsive to the detecting means for causing said power means to sequentially apply asynchronous pulses to said coils until the motor rotates at some minimum speed.

3. The motor of claim 2 wherein:
   said means for causing said power means to sequentially apply asynchronous pulses includes means for causing said power means to sequentially apply a plurality of asynchronous pulses of timed duration to said coils and then to sequentially apply pulses of a duration responsive to said feedback means to said coils.

4. The motor of claim 2 wherein:
   said means for causing said power means to sequentially apply asynchronous pulses includes means for causing said power means to sequentially apply a plurality of asynchronous pulses of timed duration to said coils.

5. The motor of claim 2 wherein:
   said means for causing said power means to sequentially apply asynchronous pulses includes means for causing said power means to sequentially apply pulses of a duration responsive to said feedback means to said coils.

6. The motor of claim 2 wherein:
   said feedback means includes means for sensing back-EMF on said windings;
   the controller includes speed control means which varies the width of said pulses to control the operating speed of said motor;
   said start-up means is responsive to the sensed back-EMF for determination of the predetermined direction and the minimum speed;
   said commutation means is operative to commutate said windings asynchronously in response to the sensed back-EMF on said windings when said motor reaches the minimum speed and until the motor reaches a predetermined range of operating speed;

the control includes means for reducing the speed of the motor to an idle speed in response to an external idling signal; and the control includes means for delivering an alarm signal when the speed of said motor drops below a set minimum operating speed.

7. The motor of claim 2 wherein:

the controller includes speed control means which varies the width of said pulses to control the operating speed of said motor.

8. The motor of claim 2 wherein:

said feedback means includes the sensing means for sensing back-EMF on said windings.

9. The motor of claim 8 wherein:

said start-up means is responsive to the sensed back-EMF for determination of the predetermined direction and the minimum speed.

10. The motor of claim 9 wherein:

said commutation means is operative to commutate said windings asynchronously in response to the sensed back-EMF on said windings when said motor reaches the minimum speed and until the motor reaches a predetermined range of operating speed.

11. The motor of claim 2 wherein:

the control includes means for reducing the speed of the motor to an idle speed in response to an external idling signal.

12. The motor of claim 2 wherein:

the control includes means for delivering an alarm signal when the speed of said motor drops below a set minimum operating speed.

13. The motor of claim 2 wherein:

said feedback means includes a Hall device for sensing rotor position.

14. A small, high torque, high speed, brushless, low voltage DC motor for a liquid fogging device capable of dispensing fogged liquid from an outer surface of a rotatable ring of porous material through which liquid to be fogged is centrifugally communicated from a ring inlet at the interior thereof to the ring outer surface, said motor comprising:

a stationary stator assembly of at least eight poles having a stator stack formed of a laminated plurality of flat sections of ferromagnetic material, said stator stack having an outer surface and a continuous inner cylindrical surface concentric with said motor shaft, a plurality of axial slots spaced around said motor shaft and a plurality of different phase multi-pole electromagnet windings wound in said slots;

a rotor assembly of at least six poles having an output shaft drivably connectable to the rotatable ring, said rotor assembly being rotatably mounted for high speed rotational movement within the stator stack on said shaft and having rotor stack formed of a laminated plurality of flat sections of ferromagnetic material surrounding, concentric with and fixed to said motor shaft, said rotor stack having a continuous cylindrical outer surface supported in close proximity with the inner surface of said stator assembly stack and concentric therewith; and, a controller having power input conductors connectable to a low voltage DC power source and output conductors connected to said windings, said controller including power means for selectively applying power pulses to said windings, feedback means for sensing the position of said rotor, and commutation means for timing said power means in response to said feedback means to operate said motor at high rotational speed.

15. The motor of claim 14 wherein:

said commutation means operates said motor at a speed of from approximately 23,000 RPM to at least 30,000 RPM;

said rotor stack has at least eight axial slots formed of axially aligned holes in the sections thereof, said rotor having at least eight permanent bi-polar magnets each mounted in a respective one of said slots;

said windings of said stator assembly each are wound in the slots of said stator stack in an eight pole configuration and magnetically coupled to the magnets of said rotor assembly;

the slots of the rotor assembly are equally spaced therearound with said magnets oriented tangentially with like poles of adjacent magnets facing each other;

the slots of said stator stack extend through the outer surface thereof, said windings being externally wound therein;

said stator assembly having four phases, each phase containing eight coils wound in three turns per coil, and each being formed of a multiple strand conductor;

the magnets are not greater than approximately ½" in length, the rotor stack is not greater than approximately 0.55" in length and approximately ⅝" in diameter, and the stator stack not greater than approximately ⅝" in length; and, said stator stack is encapsulated in reinforcing plastic insulative material and has a bridge ring on the inner surface thereof which surrounds said rotor assembly, said bridge ring of the encapsulated stator being honed to a negligible thickness insufficient to support significant leakage flux therethrough of not greater than approximately 0.010", said bridge ring being spaced from the outer surface of said rotor stack so as to maintain a thin air gap therebetween in the order of approximately 0.005".

16. The motor of claim 14 wherein:

said commutation means operates said motor at a speed of from approximately 23,000 RPM to at least 30,000 RPM.

17. The motor of claim 14 wherein:

said rotor stack has at least eight axial slots formed of axially aligned holes in the sections thereof, said rotor having at least eight permanent bi-polar magnets each mounted in a respective one of said slots.

18. The motor of claim 14 wherein:

the slots of the rotor assembly are equally spaced therearound with said magnets oriented tangentially with like poles of adjacent magnets facing each other.

19. The motor of claim 14 wherein:

said Windings of said stator assembly are each wound in the slots of said stator stack in an eight pole configuration.

20. The motor of claim 14 wherein:

the slots of said stator stack extend through the outer surface thereof, said windings being externally wound therein.

21. The motor of claim 14 wherein:

the rotor assembly has at least eight poles.

22. The motor of claim 21 wherein:
the number of phases of said stator assembly is four.
23. The motor of claim 21 wherein:
each of said coils is a three turn winding.
24. The motor of claim 23 wherein:
each of said Coils is formed of a four strand conductor.
25. The motor of claim 21 wherein:
each of said coils is formed of a multiple strand conductor.
26. The motor of claim 21 wherein:
the magnets are approximately ½" in length, the rotor stack is approximately 0.55" in length and approximately ⅝" in diameter, and the stator stack is approximately ⅝" in length.

27. The motor of claim 24 wherein:
said stator stack is encapsulated in reinforcing plastic insulative material and has a bridge ring on the inner surface thereof which surrounds said rotor assembly, said bridge ring of the encapsulated stator being honed to a negligible thickness insufficient to support significant leakage flux therethrough.
28. The motor of claim 27 wherein:
the thickness of said bridge ring is approximately 0.010".
29. The motor of claim 27 wherein:
said bridge ring is spaced from the outer surface of said rotor stack so as to maintain a thin air gap therebetween in the order of approximately 0.005".

* * * * *

UNITED STATES PATENT AND TRADEMARK OFFICE
CERTIFICATE OF CORRECTION

PATENT NO.   : 5,099,182
DATED        : March 24, 1992
INVENTOR(S)  : Isaacson et al.

It is certified that error appears in the above-identified patent and that said Letters Patent is hereby corrected as shown below:

Col. 11, line 33, "Knight" should be --Nike et al.

Signed and Sealed this

Nineteenth Day of October, 1993

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,099,182
DATED : March 24, 1992
INVENTOR(S) : Milton S. Isaacson, et al.

It is certified that error appears in the above-indentified patent and that said Letters Patent is hereby corrected as shown below:

Column 4, line 14, after "motor" insert --11--.

This Certificate supersedes Certificate of Correction issued October 19, 1993.

Signed and Sealed this

Twenty-eighth Day of June, 1994

Attest:

BRUCE LEHMAN

*Attesting Officer*   *Commissioner of Patents and Trademarks*